United States Patent
Hirano et al.

(10) Patent No.: US 9,504,996 B2
(45) Date of Patent: Nov. 29, 2016

(54) STRONTIUM-EXCHANGED CLINOPTILOLITE

(71) Applicant: TOSOH CORPORATION, Shunan-shi, Yamaguchi (JP)

(72) Inventors: Shigeru Hirano, Shunan (JP); Hajime Funakoshi, Shunan (JP); Yoju Shimizu, Shunan (JP)

(73) Assignee: TOSOH CORPORATION, Shunan-shi, Yamaguchi (JP)

( * ) Notice: Subject to any disclaimer, the term of this patent is extended or adjusted under 35 U.S.C. 154(b) by 0 days.

(21) Appl. No.: 14/366,574

(22) PCT Filed: Dec. 19, 2012

(86) PCT No.: PCT/JP2012/008111
§ 371 (c)(1),
(2) Date: Jun. 18, 2014

(87) PCT Pub. No.: WO2013/094193
PCT Pub. Date: Jun. 27, 2013

(65) Prior Publication Data
US 2015/0037247 A1   Feb. 5, 2015

(30) Foreign Application Priority Data

Dec. 20, 2011 (JP) .................. 2011-277930

(51) Int. Cl.
| | |
|---|---|
| *B01J 29/06* | (2006.01) |
| *B01J 20/18* | (2006.01) |
| *B01J 29/70* | (2006.01) |
| *C01B 39/02* | (2006.01) |
| *C01B 39/46* | (2006.01) |
| *B01J 20/28* | (2006.01) |
| *B01J 20/10* | (2006.01) |
| *B01J 20/30* | (2006.01) |

(52) U.S. Cl.
CPC ............. *B01J 29/70* (2013.01); *B01J 20/183* (2013.01); *B01J 20/186* (2013.01); *B01J 20/2803* (2013.01); *B01J 20/28004* (2013.01); *B01J 20/28042* (2013.01); *B01J 20/28073* (2013.01); *B01J 20/28083* (2013.01); *B01J 20/28085* (2013.01); *B01J 20/3007* (2013.01); *B01J 29/061* (2013.01); *C01B 39/026* (2013.01); *C01B 39/46* (2013.01); *B01J 20/10* (2013.01); *B01J 20/18* (2013.01); *B01J 20/30* (2013.01); *C01P 2006/14* (2013.01); *C01P 2006/16* (2013.01)

(58) Field of Classification Search
USPC .......... 502/60, 400, 407, 411, 414; 423/700, 423/713
See application file for complete search history.

(56) References Cited

U.S. PATENT DOCUMENTS

| | | | | |
|---|---|---|---|---|
| 4,503,023 | A | * | 3/1985 | Breck et al. ................... 423/715 |
| 4,610,856 | A | * | 9/1986 | Skeels et al. .................. 423/715 |
| 4,935,580 | A | * | 6/1990 | Chao et al. ...................... 95/139 |
| 4,964,889 | A |   | 10/1990 | Chao |
| 5,045,515 | A | * | 9/1991 | Chao et al. ...................... 502/67 |
| 5,116,793 | A | * | 5/1992 | Chao et al. ...................... 502/68 |
| 5,152,813 | A |   | 10/1992 | Coe et al. |
| 5,587,003 | A |   | 12/1996 | Bulow et al. |
| 6,284,021 | B1 | * | 9/2001 | Lu et al. ........................... 95/96 |
| 6,350,298 | B1 | * | 2/2002 | Su et al. ........................... 95/96 |

FOREIGN PATENT DOCUMENTS

| | | |
|---|---|---|
| JP | 61-107941 A | 5/1986 |
| JP | 6-198115 A | 7/1994 |
| JP | 8-266844 A | 10/1996 |
| JP | 2011-231007 A | 11/2011 |

OTHER PUBLICATIONS

Ozkan Gul, Thesis, "Exchanges of Strontium on Clinoptilolite Zeolite", submitted Nov. 2003.*
Kowalczyk et al., "Porous structure of natural and modified clinoptilolites", Journal of Colloid and Interface Science 297 (20060, pp. 77-85.*
Ackley et al., "Adsorption Characterisitcs of High-Exchange Clinoptilolites", Ind. Eng. Chem, Res., 1991, 30, pp. 2523-2530.*
Guvenir, "Synthesis and Characterization of Clinoptilolite", Thesis submitted to Middle East Technical University, 2005, pp. 1-191.*
English translation of IPRP mailed Jul. 3, 2014 in International Application No. PCT/JP2012/008111.
Ambalavanan Jayaraman et al., "Tailored Clinoptilolites for Nitrogen/Methane Separation", Ind. Eng. Chem. Res. 2005, pp. 5184-5192, vol. 44.
International Search Report for PCT/JP2012/008111 dated Feb. 12, 2013.

* cited by examiner

*Primary Examiner* — Elizabeth Wood
(74) *Attorney, Agent, or Firm* — Sughrue Mion, PLLC

(57) ABSTRACT

[Problem] To provide a strontium ion-exchanged clinoptilolite having excellent nitrogen-absorbing properties; and a method for producing the strontium ion-exchanged clinoptilolite.
[Solution] Synthetic clinoptilolite having a strontium ion at an ion exchange site thereof is useful as a nitrogen adsorbent. The synthetic clinoptilolite can be produced by bringing a solution containing a strontium ion into contact with synthetic clinoptilolite under ambient pressure to cause ion exchange.

6 Claims, 2 Drawing Sheets

STRONTIUM-EXCHANGED CLINOPTILOLITE

CROSS REFERENCE TO RELATED APPLICATIONS

This application is a National Stage of International Application No. PCT/JP2012/008111 filed Dec. 19, 2012, claiming priority based on Japanese Patent Application No. 2011-277930 filed Dec. 20, 2011, the contents of all of which are incorporated herein by reference in their entirety.

TECHNICAL FIELD

The present invention relates to a strontium ion-exchanged clinoptilolite.

BACKGROUND ART

Clinoptilolite, one of common naturally yielding zeolites, has been industrially used as gas adsorbents. For use as gas adsorbents, clinoptilolite has been used with ion exchange sites thereof being exchanged with suitable ions. As such a clinoptilolite, ion-exchanged clinoptilolites which are obtained by ion exchange of naturally yielding clinoptilolite with different ions have been reported, such as a calcium-exchanged clinoptilolite (for example, see Patent Literature 1), a magnesium-exchanged clinoptilolite (for example, see Patent Literature 2), and a strontium-exchanged clinoptilolite (for example, see Non-Patent Literature 1).

CITATION LIST

Patent Literature

Patent Literature 1: JPS61-107941A
Patent Literature 2: U.S. Pat. No. 4,964,889

Non-Patent Literature

Non-Patent Literature 1: Ind. Eng. Chem. Res, vol. 44, pp. 5184-5192, 2005

SUMMARY OF INVENTION

Technical Problem

The present invention provides a strontium ion-exchanged clinoptilolite having improved nitrogen-adsorbing properties, and a method of producing the strontium ion-exchanged clinoptilolite.

Solution to Problem

The present inventors have intensively studied to achieve the above object and as a result, found that a synthetic clinoptilolite having strontium at ion exchange sites thereof is excellent in nitrogen-adsorbing properties. Furthermore, the present inventors have found that such a clinoptilolite is excellent not only in the adsorbing properties but also in handleability to complete the present invention.

Specifically, the present invention includes the following elements.

(1) A synthetic clinoptilolite comprising strontium ions at ion exchange sites thereof.
(2) The synthetic clinoptilolite according to (1), wherein at least 35 mol % of ions at the ion exchange sites are strontium ions.
(3) The synthetic clinoptilolite according to (1) or (2), wherein the synthetic clinoptilolite has a pore volume (pv) of 0.5 mL/g or more (pv≥0.5 mL/g) for pores having pore diameters (pd) of 3 nm≤pd≤10,000 nm.
(4) The synthetic clinoptilolite according to any one of (1) to (3), wherein the synthetic clinoptilolite has an average pore diameter (apd) of 200 nm or larger (apd≥200 nm).
(5). A method for producing the synthetic clinoptilolite according to any one of (1) to (4), comprising bringing the synthetic clinoptilolite into contact with a solution containing strontium under ambient pressure to undergo ion exchange.
(6) The method for producing the synthetic clinoptilolite according to (5), wherein the synthetic clinoptilolite is a clinoptilolite obtained by mixing an amorphous aluminosilicate gel obtained from an alkaline silicate and an aluminum salt, an alkali metal hydroxide, and water to provide a mixture satisfying:

$8 \leq SiO_2/Al_2O_3 \leq 20$, $0.25 \leq OH/SiO_2 \leq 0.5$, $0.5 \leq K/(K+Na) \leq 0.9$, and $10 \leq H_2O/SiO_2 \leq 100$ in terms of the molar ratio; and stirring the obtained mixture in the presence of a seed crystal to undergo crystallization at temperatures (ct) of 100° C. ct 200° C.
(7) A synthetic clinoptilolite molding body containing the synthetic clinoptilolite according to any one of (1) to (4).
(8) A nitrogen adsorbent containing synthetic clinoptilolite according to any one of (1) to (4).

Advantageous Effects of Invention

The present invention can provide strontium ion-exchanged clinoptilolite having improved nitrogen-adsorbing properties, and a method of producing the strontium ion-exchanged clinoptilolite.

DESCRIPTION OF EMBODIMENTS

Figure 1:
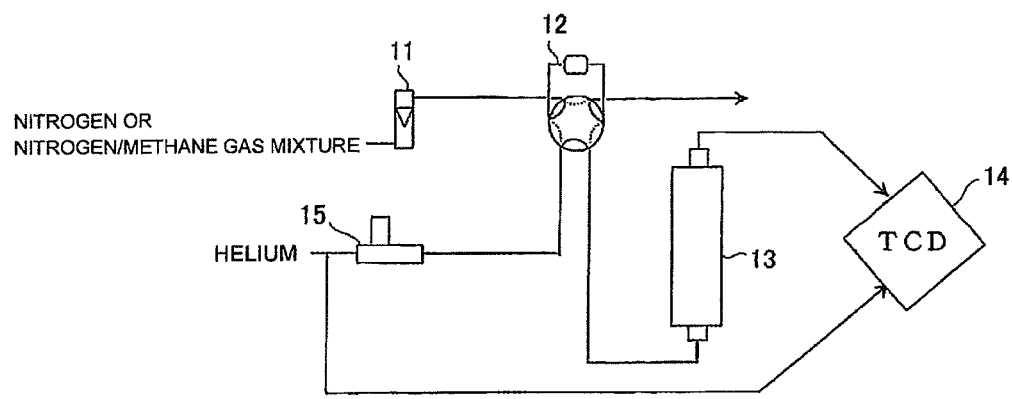
FIG. 1 is a schematic diagram illustrating an apparatus for evaluating adsorption/desorption properties by chromatography.

The present embodiment relates to a synthetic clinoptilolite having strontium ions at ion exchange sites thereof (hereinafter referred to as a "strontium-exchanged clinoptilolite").

As used herein, the "ion exchange sites" means sites which are present on negatively charged aluminum constituting clinoptilolite and have positive ions of hydrogen, alkali metals, alkaline earth metals, and transition metals to compensate negative charges of aluminum.

A strontium-exchanged clinoptilolite of the present embodiment will be described below.

The strontium-exchanged clinoptilolite of the present embodiment is synthetic clinoptilolite. Although clinoptilolite is also naturally yielding zeolite, the use of naturally yielding clinoptilolite (hereinafter referred to as "natural clinoptilolite") decreases the nitrogen equilibrium adsorption capacity. Synthetic clinoptilolite refers to clinoptilolite synthesized from starting materials, which is distinguished from natural clinoptilolite.

The strontium-exchanged clinoptilolite of the present embodiment has strontium ions ($Sr^{2+}$) at the ion exchange sites. Strontium ions at the ion exchange sites improve nitrogen-adsorbing properties.

The nitrogen-adsorbing properties can be improved with the increase in the ratio of strontium ions to ions at the ion exchange sites of synthetic clinoptilolite (hereinafter referred to as a "strontium exchange rate"). The strontium exchange rate of the strontium-exchanged clinoptilolite of the present embodiment is at least 35 mol % based on the amount of ions at the ion exchange sites of the clinoptilolite. The strontium exchange rate is preferably at least 40 mol %, more preferably at least 65 mol %, still more preferably at least 70 mol %, yet still more preferably at least 75 mol % based on the amount of ions at the ion exchange sites of the clinoptilolite.

As other ionic species than strontium ions at the ion exchange sites, alkali metal ions such as sodium ion ($Na^+$) and potassium ion ($K^+$), and alkaline earth metal ions such as magnesium ion ($Mg^{2+}$) and calcium ion ($Ca^{2+}$) can be exemplified.

The strontium exchange rate can be estimated by, for example, composition analysis for the amount (number of moles) of $Ca^{2+}$, $Sr^{2+}$, $Mg^{2+}$, $Na^+$, and $K^+$ (hereinafter referred to as "cations") and calculation of the ratio of the amount of strontium ions to the total amount of the cations by mol %.

The molar ratio of $SiO_2/Al_2O_3$ in the strontium-exchanged clinoptilolite of the present embodiment is not particularly limited. The molar ratio of $SiO_2/Al_2O_3$ can be, for example, less than 10 (or less than 5 based on the atomic ratio of Si/Al).

The strontium-exchanged clinoptilolite of the present embodiment preferably has a pore volume of 0.5 mL/g or more (pv≥0.5 mL/g) for pores having pore diameters (pd) of 3 nm≤pd≤10,000 nm (pv, total volume of pores having pd of 3 nm≤pd≤10,000 nm). The "pore diameter (pd) of 3 nm≤pd≤10,000 nm" is also hereinafter referred to as a "pore diameter of from 3 to 10,000 nm."

The pore volume (pv) is more preferably 0.7 mL/g or more (pv≥0.7 mL/g), still more preferably 0.8 mL/g or more (pv≥0.8 mL/g). The adsorption/desorption properties tends to be easily improved by the pore volume of 0.5 mL/g or more for pores having pore diameters from 3 to 10,000 nm.

The strontium-exchanged clinoptilolite of the present embodiment can consist of secondary particles formed by the aggregation of primary particles. The pore volume of pores having pore diameters from 3 to 10,000 nm corresponds, for example, to pores formed between primary particles, whereas the pore volume of pores having pore diameters of larger than 10,000 nm corresponds, for example, to voids between powder particles formed between secondary particles.

The strontium-exchanged clinoptilolite of the present embodiment preferably has an average pore diameter (apd) of 200 nm or larger (apd≥200 nm), more preferably 400 nm or larger (apd≥400 nm). The average pore diameter of 200 nm or larger provides a proper filling ability and strength. By these properties, the strontium-exchanged clinoptilolite of the present embodiment tends to be powder having excellent handleability.

The pore volume and the average pore diameter of pores having pore diameters from 3 to 10,000 nm can be measured, for example, by a mercury porosimetry.

Next, a method for producing the strontium-exchanged clinoptilolite of the present embodiment will be described.

The strontium-exchanged clinoptilolite of the present embodiment can be produced by bringing a solution containing strontium ions into contact with synthetic clinoptilolite under ambient pressure to undergo ion exchange (hereinafter, also referred to as "strontium exchange".)

As used herein, the "ambient pressure" means the conditions without depressurization or pressurization, i.e., about one atmospheric pressure (about 101325 Pa).

The clinoptilolite to be brought into contact with a solution containing strontium ions (hereinafter referred to as a "strontium solution") is preferably synthetic clinoptilolite. As a more preferred synthetic clinoptilolite, a synthetic clinoptilolite produced by:

mixing an amorphous aluminosilicate gel obtained from an alkaline silicate and an aluminum salt, an alkali metal hydroxide, and water to obtain a mixture (hereinafter referred to as a "material mixture") satisfying:

$8 \leq SiO_2/Al_2O_3 \leq 20$, $0.25 \leq OH/SiO_2 \leq 0.5$, $0.5 \leq K/(K+Na) \leq 0.9$, and $10 \leq H_2O/SiO_2 \leq 100$ in terms of the molar ratio; and stirring the obtained material mixture in the presence of a seed crystal to undergo crystallization at temperatures (ct) of 100° C.≤ct≤200° C., can be exemplified.

In this case, as an alkaline silicate, an aqueous solution of sodium silicate, potassium silicate, or silica sol is preferably used. Furthermore, amorphous silica, silica gel, kaolinite, diatomaceous earth, and the like, which are solid silica sources, are preferably used in the form of alkaline silicates by dissolving them with alkaline components.

As the aluminum salt, aqueous solutions of sodium aluminate, potassium aluminate, and chloride, nitrate, and sulfate of aluminum, and the like are preferably used. Furthermore, solid aluminum sources such as aluminum hydroxide are preferably used in the form of aluminum salts by dissolving them with mineral acids or alkaline components.

The amorphous aluminosilicate gel is preferably used which is obtained by mixing an aqueous solution of alkaline silicate and an aqueous solution of the aluminum salt. The temperature during mixing can be, for example, within the range from room temperature to 100° C.

Alkaline components such as sodium hydroxide and potassium hydroxide, or acid components such as sulfuric acid and hydrochloric acid can be optionally added to a mixture of the aqueous solution of alkaline silicate and the aqueous solution of the aluminum salt, if necessary.

It is preferred that the obtained amorphous aluminosilicate gel be optionally washed by filtration or so to remove by-product salts, if necessary.

Next, the material mixture is preferably obtained from water, sodium hydroxide and/or potassium hydroxide, and the obtained amorphous aluminosilicate gel.

The composition of the material mixture preferably satisfies $8 \leq SiO_2/Al_2O_3 \leq 20$, $0.25 \leq OH/SiO_2 \leq 0.5$, $0.5 \leq K/(K+Na) \leq 0.9$, and $10 \leq H_2O/SiO_2 \leq 100$ in terms of the molar ratio.

The molar ratio of $OH/SiO_2$ in this range reduces production of zeolites other than clinoptilolite or minerals (by-products) other than zeolites. Similarly, the molar ratio of $K/(K+Na)$ from 0.5 to 0.9 can suppress production of zeolites other than clinoptilolite.

The obtained material mixture is heated to undergo crystallization.

The crystallization temperature (ct) is preferably from 100° C. to 200° C. (100° C.≤ct≤200° C.). The crystallization temperature of 100° C. or higher tends to accelerates crystallization. As the crystallization temperature increases, the crystallization rate tends to increases. However, the crystallization temperature of 200° C. or lower can cause crystallization without requiring high temperature/high pressure reactors, and thus the crystallization temperature is preferably 200° C. or lower.

The crystallization time is, for example, about 1 to 15 days as the period for which the crystallization sufficiently proceeds.

The crystallization is preferably performed under stirring. The crystallization under stirring not only increases the crystallization rate, but also facilitates formation of a single phased clinoptilolite.

In the crystallization, a seed crystal is preferably added to the material mixture. Addition of the seed crystal to the material mixture to undergo crystallization can significantly reduce the crystallization time. The seed crystal is preferably clinoptilolite, and either natural clinoptilolite or synthetic clinoptilolite can be used. The amount (s) of the seed crystal is preferably from 1% by weight to 20% by weight (1% by weight≤s≤20% by weight) of the material mixture. The amount of the seed crystal of 1% by weight or more can provide the effect of reducing the crystallization time. Since the amount of the seed crystal of 20% by weight can provide a sufficient effect of reducing the crystallization time, the amount of the seed crystal can be, for example, 20% by weight or less.

After the completion of the crystallization, the produced crystal is separated from a mother liquor, washed, and dried to give crystal powder, thereby the clinoptilolite of Na,K-type (hereinafter referred to as Na,K-type clinoptilolite) is obtained.

The obtained Na,K-type clinoptilolite is preferably represented by the following formula.

$x(K,Na)_2O \cdot Al_2O_3 \cdot ySiO_2 \cdot zH_2O$ (wherein $0.8 \leq x \leq 1.2$, $7.0 \leq y \leq 12.0$, $z \geq 0$, and $0.50 \leq K/(K+Na) \leq 0.98$)

In the above formula, y (molar ratio of $SiO_2/Al_2O_3$) is from 7.0 to 12.0. The molar radio y of 7.0 or more improves the thermal resistance of the clinoptilolite, whereas the molar radio y of 12.0 or less tends to facilitates formation of a single phase of clinoptilolite. The content of the crystal phase (cryR) is preferably 90% or more (cryR≥90%), more preferably 95% or more (cryR≥95%).

The clinoptilolite preferably has the above general formula wherein $K/(K+Na)=0.50$ to 0.98.

The method of producing the synthetic clinoptilolite of the present embodiment is characterized by the bringing a strontium solution into contact with synthetic clinoptilolite under ambient pressure. This process causes exchange of ions at the ion exchange sites of the clinoptilolite with strontium ions.

As a strontium solution, aqueous solutions in which soluble strontium salts such as $SrCl_2$ and $Sr(NO_3)_2$ are solved can be exemplified.

As long as the strontium solution is brought into contact with synthetic clinoptilolite under ambient pressure, any strontium exchange process can be used. As a strontium exchange process, for example, a batch type and a circulation type can be used, and such a strontium exchange process can provide strontium-exchanged clinoptilolite having an objected strontium exchange rate. However, ion exchange processes under high pressure (for example, 2 atm or more) are not preferred because the powder properties of clinoptilolite powder change.

The temperature of the strontium exchange is preferably 40° C. or higher (et≥40° C.), more preferably 60° C. or higher (et≥60° C.). However, if the temperature of the strontium exchange is too high, the concentration of the strontium solution is unstable. For this reason, the strontium exchange is preferably performed at temperatures of 100° C. or lower.

The clinoptilolite after the strontium exchange is preferably washed with ion exchange water and dried. By these procedures, the impurities and the like which are adhered to the surface of the clinoptilolite can be removed.

The strontium-exchanged clinoptilolite of the present embodiment can be used as a nitrogen adsorbent. When the strontium-exchanged clinoptilolite of the present embodiment is used as an adsorption separating agent, dehydration process was preferably performed by heating at temperatures (ht) from 400° C. to 600° C. (400° C.≤ht≤600° C.). The strontium-exchanged clinoptilolite of the present embodiment can also be used as an adsorption separating agent in the form of the molding body.

As used herein, the "molding body." means clinoptilolite containing clinoptilolite powder and at least one binder and differs from a so-called pressed clinoptilolite powder obtained by pressing only clinoptilolite powder and from clinoptilolite particles obtained by pulverization of massive clinoptilolite.

Hereinafter, the molding body, containing the strontium-exchanged clinoptilolite of the present embodiment is referred to as a "strontium-exchanged clinoptilolite molding body." or "clinoptilolite molding body, according to the present embodiment."

The clinoptilolite molding body, according to the present embodiment may be configured by, for example, molding a molding body, using clinoptilolite powder (the obtained molding body, is hereinafter referred to as an "untreated molding body") and subsequently performing strontium exchange of the untreated molding body.

When the untreated molding body to be subjected to strontium exchange is used, the ratio of the total volume of pores having pore diameters (pd) of 50 nm≤pd≤1,000 nm to the total volume of pores having pore diameters (pd) of 3 nm≤pd≤250,000 nm (hereinafter referred to as "pore volume ratio (vr)") is preferably 50% or more (vr≥50%) in the untreated molding body. The pore volume ratio is more preferably 65% or more (vr≥65%), still more preferably 75% or more (vr≥75%). The pore volume ratio of 50% or more enables efficient strontium exchange to provide the clinoptilolite molding body according to the present embodiment having an objected strontium exchange rate without using a large excess strontium solution. As the pore volume ratio is higher, this effect tends to be easily obtained. Furthermore, the adsorbent obtained by the strontium exchange of the untreated molding body having a pore volume ratio of 50% or more exhibits high adsorption/desorption rate in the adsorption separation and has high adsorbing properties. As the pore volume ratio which allows the untreated molding body to have a high strontium exchange rate and proper mechanical strength, the pore volume ratio of 80% or less (vr≤80%) is exemplified.

In the clinoptilolite molding body according to the present embodiment, the pore volume of pores having diameters of 100 μm or greater tends to account for 10% or less of the total pore volume. Since the clinoptilolite molding body according to the present embodiment contains clinoptilolite powder and a binder, the number of pores having diameters of around 100 μm formed between clinoptilolite powder particles decreases. On the other hand, in the-pressed body of clinoptilolite powder or the like, the pore volume of pores having diameters of 100 μm or greater tends to account for as high as about 35% to 40% of the total pore volume.

The amount (b) of the binder contained in the clinoptilolite molding body according to the present embodiment is preferably 5 parts by weight or more (b≥5 parts by weight), more preferably 10 parts by weight or more (b≥10 parts by weight) based on 100 parts by weight of the clinoptilolite. When the amount (b) of the binder is 5 parts by weight or more, the clinoptilolite molding body tends to easily attains pressure intensity sufficient for industrial applications. In contrast, when containing 30 parts by weight or less of the binder (b≤30 parts by weight), the clinoptilolite molding body tends to have pressure intensity sufficient for industrial applications and have high adsorbing properties.

The kind of the binder contained in the clinoptilolite molding body according to the present embodiment can be appropriately selected. As preferred binders, clay minerals such as kaolin, attapulgite, sepiolite, and montmorillonite, and inorganic binders such as silica and alumina can be exemplified.

The clinoptilolite molding body according to the present embodiment may contain a molding assistant together with the binder. The molding assistant is used to improve the molding ability during the production of the molding body, and carboxymethyl cellulose (CMC), polyvinyl alcohol (PVA), sodium tripolyphosphate, and mixtures thereof can be exemplified. The content of the molding assistant (ma) can be, for example, from 1 to 10 parts by weight (1 part by weight≤ma≤10 parts by weight) based on 100 parts by weight of the clinoptilolite.

The shape of the clinoptilolite molding body according to the present embodiment can be selected depending on the purpose. As a preferred shape, cylindrical, spherical, trefoil, ring, honeycomb, and film shape can be exemplified.

The pressure intensity (pi) of the clinoptilolite molding body according to the present embodiment is preferably 5 N or more (pi≥5 N), more preferably 30 N or more (pi≥30 N), still more preferably 35 N or more (pi≥35 N). The pressure intensity of 5 N or more prevents the clinoptilolite molding body according to the present embodiment from a breakage or so during the use as an adsorbent or the like. However, it is unnecessary for the pressure intensity to be higher than needed and for example, the pressure intensity of 50 N is sufficient.

A method of producing the clinoptilolite molding body according to the present embodiment will be described as follows.

The untreated molding body which can be used for producing the clinoptilolite molding body according to the present embodiment preferably has the pore volume ratio described above, and the production process of the untreated molding body can be appropriately selected. As a preferred production processes of the untreated molding body, a production process involving kneading synthetic clinoptilolite powder and at least one binder, followed by molding and calcinating can be exemplified.

The clinoptilolite powder used for producing the untreated molding body preferably has an average secondary particle diameter (aspd) of 15 μm or more (aspd≥15 μm) and a secondary particle diameter distribution with one peak in the range of 5 μm≤spd≤15 μm and another peak in the range of 30 μm≤spd≤100 μm, wherein spd represents a secondary particle diameter. Even if an ion exchange is undergone, the solid-liquid separation and washing after ion-exchange become to be easier by these characteristics.

Moreover, the clinoptilolite powder used for producing the untreated molding body preferably has a compression rate (cr) of 15%≤cr≤40%, an apparent density (ad) of 0.2 g/cm$^3$≤ad≤0.4 g/cm$^3$, and a tap density (td) of 0.30 g/cm$^3$≤td≤0.45 g/cm$^3$. The clinoptilolite powder having physical properties in these ranges is easier to handle.

Apparent density, also called untapped density, refers to a density of powder in the state after natural fall for filling. Tap density, also called tapped density, refers to a density of powder in the state after tapping of a container filled with a sample from a given height.

The molding body after molding is preferably calcinated. This tends to increase the pressure intensity of the clinoptilolite molding body according to the present embodiment. The calcinating temperature can be appropriately selected, for example, from 400° C. to 700° C.

The strontium-exchanged clinoptilolite of the present embodiment has excellent nitrogen-adsorption/desorption properties. For this, the strontium-exchanged clinoptilolite of the present embodiment can be used as a gas-separating agent. Furthermore, the strontium-exchanged clinoptilolite of the present embodiment having anti-deforming characteristic for powder shape and excellent handleability can be provided.

EXAMPLES

The present invention will be described below in more detail by way of Examples. However, the present invention is not limited to these Examples.

(Composition Analysis)

A sample was dissolved in a fluoric acid solution and nitric acid, and the composition of the sample was measured with ICP-AES (apparatus used: OPTIMA 3000 DV produced by Perkin Elmer Inc.) $Ca^{2+}$, $Sr^{2+}$, $Mg^{2+}$, $Na^+$, and $K^+$ (hereinafter referred to as "cations") were measured to calculate the ratio of each cation to the total amount of these cations by mol %.

(Crystal Content of Clinoptilolite)

The crystal content of the clinoptilolite was measured by X-ray diffraction. An X-ray diffractometer (MXP3, produced by MAC science) was used to measure diffraction peaks at 2θ=3° to 40°. From the obtained X-ray diffraction chart, the peak ratio of clinoptilolite to an impurity phase was obtained, and the crystal content was calculated based on the obtained peak ratio. In addition, the clinoptilolite was identified using X-ray diffraction data of HEU-type zeolite described in Collection of Simulated XRD Powder Patterns for Zeolites, Fifth Revised Edition 2007, ELSEVIA, pp. 206-207.

(Pore Volume and Pore Volume Ratio)

Clinoptilolites of Examples and Comparative Examples were dehydrated at 350° C. and evaluated by a mercury porosimetry. An apparatus used for the mercury porosimetry was AutoPore 9510 produced by Micromeritics Instrument Corporation.

The pore volume (pv) was obtained by calculating the total volume of pores having pore diameters from 3 to 10,000 nm. The average pore diameter (apd) is defined as a pore diameter corresponding to 50% pore volume of pores having pore diameters from 3 to 10,000 nm.

The pore volume ratio was calculated as follows.

First, the total volume of pores having pore diameters (pd) of 3 nm≤pd≤250,000 nm was obtained as the total pore volume. Next, the total volume of pores having pore diameters (pd) of 50 nm≤pd≤1,000 nm was obtained as 50 to 1,000 nm pore volume. The ratio of the obtained 50 to 1,000 nm pore volume to the total pore volume was calculated as the pore volume ratio.

(Pressure Intensity)

A Kiya-type digital hardness tester KHT-20N (produced by Fujiwara Scientific Company Co., Ltd.) was used. The pressure intensity was measured for 25 samples and the average thereof was calculated as Pressure Intensity.

(Nitrogen Equilibrium Adsorption Capacity)

The nitrogen equilibrium adsorption capacity was measured with BELLSORP-HP (produced by BEL Japan, Inc.) The samples were sized to have particle diameters from 0.5 to 1 mm. The samples were heated under vacuum at 350° C. for 2 hours as pretreatment. The nitrogen equilibrium adsorption capacity at 760 mmHg was measured at an adsorption temperature of 25° C.

(Evaluation of Nitrogen-Adsorption/Desorption Properties by Chromatography)

After the clinoptilolites of Examples and Comparative Examples were sized to have particle diameters from 0.35 to 0.5 mm, and about 4.5 mL of the clinoptilolites were dehydrated in the air at 500° C. for 1.5 hours, the obtained clinoptiolite was filled in a stainless steel column, 4.35 mm inner diameter×30 cm long, maintained at 25° C. while helium was allowed to pass through the column. Helium was caused to pass through the column as a carrier gas at a flow rate of 50 NmL/min, and the channel of a six-port gas sampler was switched to inject 1 cc pulse of pure nitrogen gas into the column, and nitrogen in an outlet gas was detected with a TCD detector to obtain a chromatogram.

The schematic diagram of the apparatus is shown in FIG. 1. The apparatus in FIG. 1 includes 11: a flow meter, 12: a six-port gas sampler (1 ml), 13: a column, 14: a TCD detector, and 15: a massflow controller.

Example 1

An amorphous aluminosilicate gel prepared from pure water, a sodium hydroxide aqueous solution, a potassium hydroxide aqueous solution, sodium silicate, and aluminum sulfate was mixed to have the below composition, thereby obtaining a material mixture.

$SiO_2/Al_2O_3=11.7$ $OH/SiO_2=0.34$ $K/(K+Na)=0.70$ $H_2O/SiO_2=15$

To the obtained material mixture, 2% by weight of natural clinoptilolite was added as a seed crystal based on the weight of the material mixture, and the resultant mixture was heated at 150° C. for 72 hours under stirring to undergo crystallization. After the crystallization, cooling, filtration, washing, and drying were performed to obtain powdery Na,K-type clinoptilolite.

The obtained Na,K-type clinoptilolite satisfied $SiO_2/Al_2O_3=9.6$, $(Na,K)_2O/Al_2O_3=0.99$, and $K/(K+Na)=0.90$.

The obtained Na,K-type clinoptilolite exhibited no peaks other than the peak belonging to clinoptilolite in X-ray diffraction measurement, showing that the crystal content of the clinoptilolite was 100%. In addition, the pore volume and the average pore diameter of pores having pore diameters from 3 to 10,000 nm in the obtained synthetic clinoptilolite were 0.88 mL/g and 410 nm, respectively.

37 grams of the obtained Na,K-type clinoptilolite was added to 1000 mL of a strontium ion aqueous solution containing 1 mol/L of $SrCl_2$ and 0.28 mol/L of NaCl (hereinafter referred to as "ion exchange aqueous solution") and the resultant mixture was stirred at 60° C. for 2 hours twice to undergo strontium exchange. After the strontium exchange, the mixture was dried at 110° C. for 12 hours in the atmosphere to obtain a strontium-exchanged clinoptilolite of Example 1. The measurement results of the composition analysis and nitrogen equilibrium adsorption capacity are shown in Table 1.

Example 2

A strontium-exchanged clinoptilolite of Example 2 was obtained in the same manner as in Example 1 except for that 1000 mL of an ion exchange aqueous solution containing 1 mol/L of $SrCl_2$ and 0.14 mol/L of NaCl was used for the strontium exchange. The measurement results of the composition analysis and nitrogen equilibrium adsorption capacity are shown in Table 1.

Example 3

Figure 2:
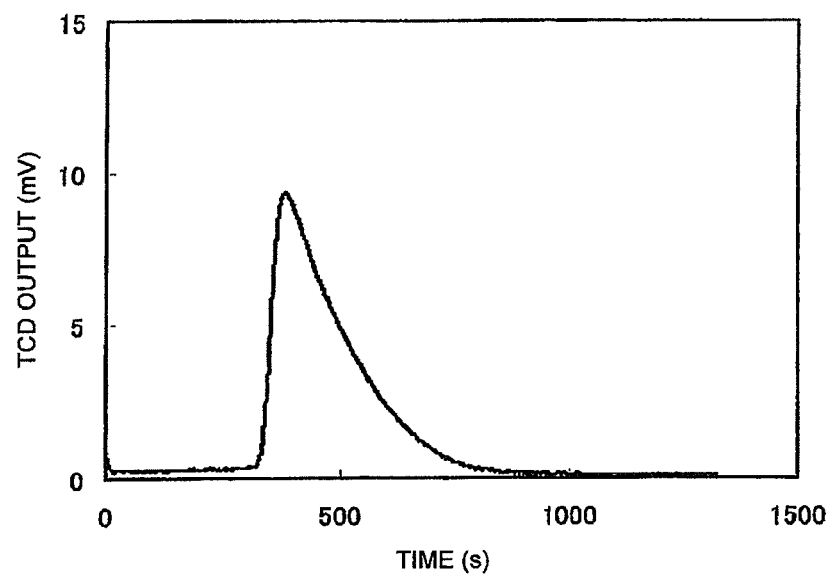
FIG. 2 is a chromatogram of nitrogen for Example 3.

A strontium-exchanged clinoptilolite of Example 3 was obtained in the same manner as in Example 1 except for that 1000 mL of an ion exchange aqueous solution containing 1 mol/L of $SrCl_2$ and 0.12 mol/L of NaCl was used for the strontium exchange. The measurement results of the composition analysis and nitrogen equilibrium adsorption capacity are shown in Table 1. The chromatogram of nitrogen for the strontium-exchanged clinoptilolite of Example 3 is shown in FIG. 2.

Example 4

A strontium-exchanged clinoptilolite of Example 4 was obtained in the same manner as in Example 1 except that 1000 mL of an ion exchange aqueous solution containing 2 mol/L of $SrCl_2$ and 0.28 mol/L of NaCl was used for the strontium exchange. The measurement results of the composition analysis and nitrogen equilibrium adsorption capacity are shown in Table 1.

Example 5

A strontium-exchanged clinoptilolite of Example 5 was obtained in the same manner as in Example 1 except that 1000 mL of an ion exchange aqueous solution containing 0.05 mol/L of SrCl$_2$ and 0.14 mol/L of NaCl was used for the strontium exchange. The measurement results of the composition analysis and nitrogen equilibrium adsorption capacity are shown in Table 1.

As described above, the strontium-exchanged clinoptilolites of the present invention have large pore volumes and thus can increase the ion exchange rate even under the same ion exchange conditions, showing excellent ion exchange properties. In addition, the clinoptilolites have high purity and, for example, large nitrogen equilibrium adsorption capacity. Furthermore, the clinoptilolites of the present invention shows high adsorption/desorption rate and excellent gas separation properties because the clinoptilolites of the present invention have large pore volumes and their chromatogram peak for nitrogen has a small width.

Comparative Example 1

Japanese natural clinoptilolite was used to carry out strontium exchange. The composition of the clinoptilolite used was 29.5 mol % Na, 13.1 mol % K, 14.5 mol % Mg, and 41.9 mol % Ca. The pore volume and the average pore diameter of pores having diameters from 3 to 10,000 nm were 0.33 mL/g and 139 nm, respectively.

The obtained clinoptilolite was used to carry out ion exchange where ions at the ion exchange sites were substituted by potassium ions (hereinafter referred to as "potassium exchange"). The potassium exchange was carried out by filling the column with natural clinoptilolite which is sized to have particle diameters from 0.355 to 0.5 mm, and causing 1.05 mol/L of a KCl solution to pass through the column under the conditions of 25 mL/min at 80° C. The composition of the clinoptilolite after the potassium exchange was 17.0 mol % Na, 47.9 mol % K, 7.7 mol % Mg, and 27.4 mol % Ca. This potassium exchange allows the clinoptilolite before the strontium exchange to have the same composition as in Examples.

Figure 3:
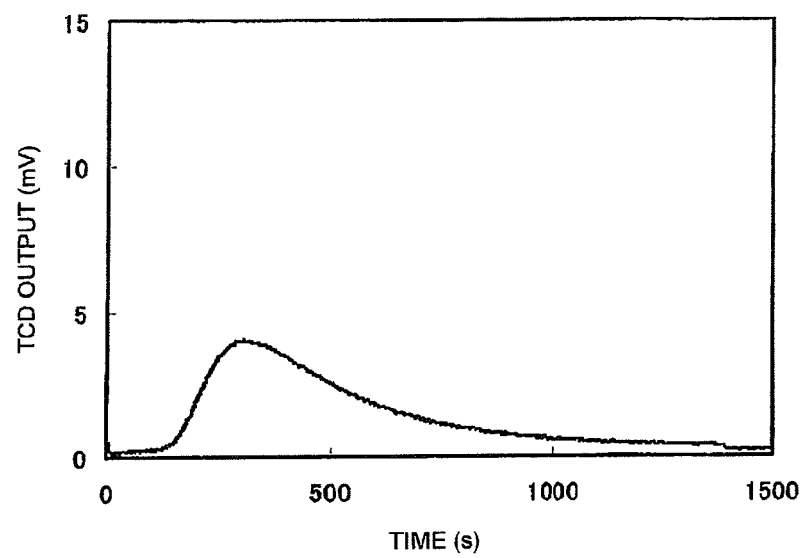
FIG. 3 is a chromatogram of nitrogen for Comparative Example 1.

The potassium-exchanged, natural clinoptilolite was used to carry out the same strontium exchange as in Example 1 to obtain a strontium-exchanged natural clinoptilolite. The measurement results of the composition analysis and nitrogen equilibrium adsorption capacity are shown in Table 1. In addition, the chromatogram of nitrogen for the clinoptilolite of Comparative Example 1 is shown in FIG. 3.

Comparative Example 2

American natural clinoptilolite was used to carry out the same potassium exchange as in Comparative Example 1. The composition of the clinoptilolite before the potassium exchange was 7.6 mol % Na, 24.4 mol % K, 25.1 mol % Mg, and 42.8 mol % Ca. The pore volume and the average pore diameter of pores having pore diameters from 3 to 10,000 nm were 0.21 mL/g and 144 nm, respectively.

The composition of the potassium-exchanged clinoptilolite was 6.9 mol % Na, 62.5 mol % K, 15.9 mol % Mg, and 14.7 mol % Ca.

This potassium-exchanged, natural clinoptilolite was used to carry out the same strontium exchange as in Example 1 to obtain a strontium-exchanged, natural clinoptilolite. The measurement results of the composition analysis and nitrogen equilibrium adsorption capacity are shown in Table 1.

The clinoptilolite obtained in Comparative Example 1 exhibited a higher strontium exchange rate than the strontium-exchanged clinoptilolite of Example 5. However, the nitrogen equilibrium adsorption capacity of Comparative Example 1 was only about 60 percent of that of Example 5.

As shown from Comparative Examples 1 and 2, not only natural clinoptilolite exhibited a low strontium exchange rate, but also the nitrogen equilibrium adsorption capacity thereof decreases with increasing strontium exchange rate.

Comparative Example 3

37 grams of the Na,K-type clinoptilolite obtained in Example 1 was added to 1000 mL of an ion exchange aqueous solution containing 1 mol/L of CaCl$_2$ and 0.14 mol/L of NaCl, and the resultant mixture was stirred at 60° C. for 2 hours twice to undergo ion exchange where ions at the ion exchange sites were substituted by calcium ions (hereinafter referred to as "calcium exchange".) After the calcium exchange, the mixture was dried at 110° C. for 12 hours in the atmosphere to obtain a calcium-exchanged clinoptilolite of Comparative Example 3. The measurement results are shown in Table 1.

Comparative Example 4

A calcium-exchanged clinoptilolite of Comparative Example 4 was obtained in the same manner as in Comparative Example 3 except for that 1000 mL of an ion exchange aqueous solution containing 0.1 mol/L of CaCl$_2$ and 0.14 mol/L of NaCl was used. The measurement results are shown in Table 1.

Comparative Example 5

A calcium-exchanged clinoptilolite of Comparative Example 5 was obtained in the same manner as in Comparative Example 3 except for that 1000 mL of an ion exchange aqueous solution containing 2 mol/L of CaCl$_2$ and 0.14 mol/L of NaCl was used. The measurement results are shown in Table 1.

The measurement results in Comparative Examples 3 to 5 showed that the ion-exchanged clinoptilolites obtained by the ion exchange with calcium ions instead of strontium ions exhibited lower nitrogen equilibrium adsorption capacity than the clinoptilolites of the present invention.

TABLE 1

| | ION RATIO AT ION EXCHANGE SITES (mol %) | | | | | NITROGEN EQUILIBRIUM ADSORPTION CAPACITY |
|---|---|---|---|---|---|---|
| | $Na^+$ | $K^+$ | $Mg^{2+}$ | $Ca^{2+}$ | $Sr^{2+}$ | (NmL/g) |
| Example 1 | 11.4 | 17.0 | 0.2 | 1.3 | 70.1 | 26.9 |
| Example 2 | 4.8 | 14.5 | 0.2 | 0.8 | 79.7 | 26.8 |
| Example 3 | 3.7 | 13.4 | 0.2 | 0.6 | 82.1 | 26.8 |
| Example 4 | 5.4 | 8.6 | 0.1 | 1.4 | 84.5 | 26.8 |
| Example 5 | 22.3 | 38.5 | 0.1 | 0.7 | 38.4 | 22.8 |
| Comparative Example 1 | 17.3 | 10.0 | 8.0 | 20.2 | 44.5 | 13.9 |
| Comparative Example 2 | 11.2 | 21.3 | 15.9 | 12.8 | 38.8 | 14.5 |
| Comparative Example 3 | 7.2 | 23.8 | 0.2 | 68.8 | 0.0 | 17.6 |
| Comparative Example 4 | 21.8 | 41.3 | 0.1 | 36.8 | 0.0 | 18.7 |
| Comparative Example 5 | 8.9 | 14.4 | 0.2 | 76.5 | 0.0 | 12.7 |

(Evaluation of Nitrogen Adsorption Separation Properties by Chromatography)

Figure 4:
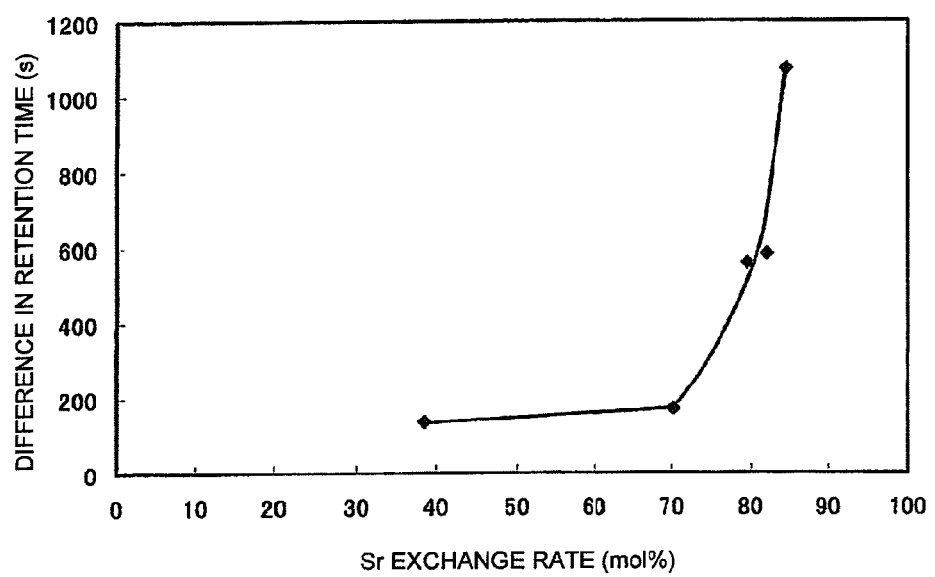
FIG. 4 is a graph of the relationship between the strontium exchange rate and the difference in retention time between nitrogen and methane in Examples 1 to 5. The strontium exchange rate corresponds to the strontium exchange rate in each Example shown in Table 1.

The clinoptilolites of Examples and Comparative Examples were sized to have particle diameters from 0.35 to 0.5 mm, and about 4.5 mL of the clinoptilolites were dehydrated in the air at 500° C. for 1.5 hours. Then, the obtained clinoptilolite was filled in a stainless steel column, 4.35 mm inner diameter×30 cm long, maintained at 25° C. while helium (purity 99.999%) was allowed to pass through the column. Helium was caused to pass through the column as a carrier gas at a flow rate of 50 NmL/min, and the channel of a six-port gas sampler was switched to inject 1 cc pulse of pure nitrogen gas into the column, and nitrogen in an outlet gas was detected with a TCD detector to obtain a chromatogram. Helium (purity≥99.999%) was caused to pass through the column as a carrier gas at a flow rate of 50 NmL/min, and the channel of a six-port gas sampler was switched to inject 1 cc pulse of an inlet gas (90% by volume of $CH_4$, 10% by volume of $N_2$) into the column, and nitrogen and methane in an outlet gas were detected with a TCD detector, and the retention times of nitrogen and methane were analyzed based on the obtained chromatogram to calculate the difference in retention time between nitrogen and methane. In addition, an apparatus used for the measurement has the same configuration as the apparatus schematically illustrated in FIG. 1. The measurement results are shown in Table 2. The relationship between the strontium exchange rate and the difference in retention time between nitrogen and methane is shown in FIG. 4.

TABLE 2

| | RETENTION TIME (s) | | DIFFERENCE IN RETENTION TIME |
|---|---|---|---|
| | $N_2$ | Methane | |
| Example 1 | 181 | 12 | 169 |
| Example 2 | 579 | 21 | 558 |
| Example 3 | 604 | 20 | 584 |
| Example 4 | 1404 | 330 | 1074 |
| Example 5 | 152 | 16 | 136 |
| Comparative Example 1 | 337 | 9 | 328 |
| Comparative Example 2 | 946 | 10 | 936 |
| Comparative Example 3 | 75 | 10 | 65 |
| Comparative Example 4 | 64 | 11 | 53 |
| Comparative Example 5 | 10 | 10 | 0 |

Example 6

The Na,K-type clinoptilolite obtained in Example 1 has an average secondary particle diameter of 46.3 μm and secondary particle diameter distribution with peaks at 9 μm and 50 μm, which is a bimodal particle diameter distribution. The apparent density, tap density, and compression rate were 0.31 g/cm$^3$, 0.38 g/cm$^3$, and 18.4%, respectively. Moreover, the obtained Na,K-type clinoptilolite powder was pressed and subjected to the measurement of the pore volume. As a result, the pores having diameters of 100 μm or larger was 37% of the total pore volume.

To 100 parts by weight of the obtained Na,K-type clinoptilolite powder, 25 parts by weight of attapulgite clay, 5 parts by weight of carboxymethyl cellulose (CMC), and an appropriate amount of water were added, and this mixture was mixed and kneaded to obtain a kneaded material. The obtained kneaded material was extruded into cylindrical shape with 1.5 mm diameter, then dried at 100° C., and fired to obtain an untreated molding body. The calcination was performed at 600° C. for 3 hours while supplying dehydrated air to a box muffle furnace at 25 L/min.

The untreated molding body had a pore volume ratio of 69.5% and a pressure intensity of 41 N.

A strontium-exchanged clinoptilolite molding body of Example 6 was obtained in the same manner as in Example 1 except for that 42.6 g of the untreated molding body was added to 1000 mL of an ion exchange aqueous solution containing 1 mol/L of $SrCl_2$ and 0.14 mol/L of NaCl. The composition of the obtained strontium-exchanged clinoptilolite molding body was 72.0% Sr, 0.6% Ca, 0.1% Mg, 10.8% Na, and 16.5% K.

The nitrogen-adsorbing property of the strontium-exchanged clinoptilolite molding body obtained in Example 6 was evaluated. As a result, the equilibrium adsorption capacity was 15.3 NmL/g (at an absorption pressure of 287 mmHg).

INDUSTRIAL APPLICABILITY

The clinoptilolite of the present invention can be used as a nitrogen adsorbent because of excellent nitrogen-adsorbing properties thereof. Furthermore, the clinoptilolite can also easily be used for industrial applications by virtue of excellent handleability.

The invention claimed is:

1. A synthetic clinoptilolite comprising strontium ions at ion exchange sites thereof, wherein the synthetic clinoptilolite has a pore volume (pv) of 0.5 mL/g or more (pv≥0.5 mL/g) for pores having pore diameters (pd) of 3 nm≤pd≤10,000 nm.

2. The synthetic clinoptilolite according to claim 1, wherein at least 35 mol % of ions at the ion exchange sites are strontium ions.

3. The synthetic clinoptilolite according to claim 1, wherein the synthetic clinoptilolite has an average pore diameter (apd) of 200 nm or larger (apd≥200 nm).

4. A method for producing the synthetic clinoptilolite according to claim 1, comprising bringing the synthetic clinoptilolite into contact with a solution containing strontium under ambient pressure to undergo ion exchange,
wherein the synthetic clinoptilolite is a clinoptilolite obtained by:
mixing an amorphous aluminosilicate gel obtained from an alkaline silicate and an aluminum salt, an alkali metal hydroxide, and water to provide a mixture satisfying:

8≤$SiO_2/Al_2O_3$≤20, 0.25≤$OH/SiO_2$≤0.5, 0.5≤K/(K+Na)≤0.9, and

10≤$H_2O/SiO_2$≤100 in terms of the molar ratio; and stirring the obtained mixture in the presence of a seed crystal to undergo crystallization at temperatures (ct) of 100° C.≤ct≤200° C.

5. A synthetic clinoptilolite molding body containing the synthetic clinoptilolite according to claim 1.

6. A nitrogen adsorbent containing synthetic clinoptilolite according to claim 1.

* * * * *